(12) United States Patent
Cai (10) Patent No.: US 9,790,294 B2
(45) Date of Patent: Oct. 17, 2017

(54) POLYMER DERIVED FROM ACRYLONITRILE

(71) Applicant: COMMONWEALTH SCIENTIFIC AND INDUSTRIAL RESEARCH ORGANISATION, Australian Capital Territory (AU)

(72) Inventor: Jackie Yun Cai, Wandana Heights (AU)

(73) Assignee: Commonwealth Scientific and Industrial Research Organisation, Australia Capital Territory (AU)

( * ) Notice: Subject to any disclaimer, the term of this patent is extended or adjusted under 35 U.S.C. 154(b) by 216 days.

(21) Appl. No.: 14/776,514

(22) PCT Filed: Mar. 14, 2014

(86) PCT No.: PCT/AU2014/000267
§ 371 (c)(1),
(2) Date: Sep. 14, 2015

(87) PCT Pub. No.: WO2014/138807
PCT Pub. Date: Sep. 18, 2014

(65) Prior Publication Data
US 2016/0024232 A1 Jan. 28, 2016

Related U.S. Application Data

(60) Provisional application No. 61/799,506, filed on Mar. 15, 2013.

(51) Int. Cl.
| | | |
|---|---|---|
| *C08F 2/00* | (2006.01) | |
| *C08F 20/44* | (2006.01) | |
| *C08F 20/50* | (2006.01) | |
| *D01F 9/12* | (2006.01) | |
| *D01F 9/22* | (2006.01) | |
| *C08F 120/44* | (2006.01) | |
| *C08F 220/44* | (2006.01) | |

(52) U.S. Cl.
CPC ............ *C08F 20/44* (2013.01); *C08F 120/44* (2013.01); *C08F 220/44* (2013.01); *D01F 9/22* (2013.01); *C08F 2438/03* (2013.01)

(58) Field of Classification Search
CPC .............................. C08F 22/30; D01F 9/22
USPC ......... 526/214; 525/329.1, 329.2; 423/447.1, 423/447.2
See application file for complete search history.

(56) References Cited

U.S. PATENT DOCUMENTS

| 3,098,060 | A | 7/1963 | Miller et al. |
| 7,205,362 | B2 | 4/2007 | Favier et al. |
| 2006/0004160 | A1 | 1/2006 | Favier et al. |
| 2009/0312505 | A1 | 12/2009 | Matyjaszewski et al. |

FOREIGN PATENT DOCUMENTS

| CN | 101885816 A | 11/2010 |
| CN | 102605475 A | 7/2012 |
| WO | WO 2013/131216 A1 | 9/2013 |

OTHER PUBLICATIONS

An, Q, et al., "Rapid Communication: Study on Kinetics of Controlled/Living Radical Polymerization of Acrylonitrile by RAFT Technique", Journal of Polymer Science: Part A: Polymer Chemistry, 2005, vol. 43, pp. 1973-1977.*
An, Q. et al., "Synthesis and Characterization of the Polyacrylonitrile-block-poly(methyl acrylate) by RAFT Technique", Chinese Chemical Letters, 2006, vol. 17, No. 3, pp. 365-368.
Chernikova, E.V. et al., "Controlled Synthesis of Polyacrylonitrile via Reversible Addition-Fragmentation Chain-Transfer Pseudo living Radical Polymerization and Its Thermal Behavior", Polymer Science, Ser B, 2011, vol. 53, Nos. 7-8, pp. 391-403.
Dong, H. et al., "Well-Defined High Molecular-Weight Polyacrylonitrile via Activators Regenerated by Electron Transfer ATRP", American Chemical Society, Macromolecules, 2007, vol. 40, pp. 2974-2977.
International Search Report issued May 22, 2014; International Application No. PCT/AU2014/000267.
Liu, X, et al., "Well-defined higher-molecular-weight polyacrylonitrile via RAFT technique in the presence of disulfide compounds as a source of chain transfer agent", European Polymer Journal, 2008, vol. 44, pp. 1200-1208.
Liu, X. et al., "2-Cyanoprop-2-yl Dithiobenzoate Mediated Reversible Addition-Fragmentation Chain Transfer Polymerization of Acrylonitrile Targeting a Polymer with a Higher Molecular Weight", Journal of Polymer Science: Part A: Polymer Chemistry, 2007, vol. 45, pp. 1272-1281.
Moad, G. et al., "Living Radical Polymerization by the RAFT Process—A Second Update", Aust J. Chem, 2009, vol. 62, pp. 1402-1472.
Niu, S. et al., "Synthesis of High Molecular Weight and Narrow Molecular Weight Distribution Poly(acrylonitrile) via RAFT Polymerization", Journal of Polymer Science, Part A: Polymer Chemistry, 2013, vol. 51, pp. 1197-1204.
Pietrasik, J. et al., "Synthesis of High Molecular Weight Poly(styrene-co-acrylonitrile) Copolymers with Controlled Architecture", American Chemical Society, Macromolecules 2006, vol. 39, pp. 6384-6390.
Quinn, J.F. et al., "Living Free-Radical Polymerization of Styrene under a Constant Source of y Radiation", Journal of Polymer Science: Part A: Polymer Chemistry, 2002, vol. 40, pp. 19-25.
Tang, C. et al., "RAFT Polymerization of Acrylonitrile and Preparation of Block Copolymers Using 2-Cyanoethyl Dithiobenzoate as the Transfer Agent", American Chemical Society, Macromolecules, 2003, vol. 36, pp. 8587-8589.

\* cited by examiner

*Primary Examiner* — William Cheung
(74) *Attorney, Agent, or Firm* — Arent Fox LLP (57) ABSTRACT

This invention relates to poly(acrylonitrile) homo- or co-polymer having a number average molecular weight (Mn) of at least 200,000 g/mol and a dispersity (Đ) of less than 1.3.

14 Claims, 1 Drawing Sheet

POLYMER DERIVED FROM ACRYLONITRILE

CROSS REFERENCE TO RELATED APPLICATIONS

This application is a National Stage application under 35 U.S.C. §371 of International Application No. PCT/AU2014/000267, having an International Filing Date of Mar. 14, 2014, which claims the benefit of U.S. Provisional Ser. No. 61/799,506 filed Aug. 15, 2015. This disclosure of the prior applications are considered part of (and are incorporated by reference in) the disclosure of this application.

FIELD OF THE INVENTION

The present invention relates in general to polymer derived from acrylonitrile monomer. In particular, the invention relates to poly(acrylonitrile) homo- and co-polymers, to a method for producing the same, to carbon fibre comprising carbonised residue of the polymer, and to a method for producing the carbon fibre. The poly(acrylonitrile) homo- and co-polymers according to the invention have been found to be particularly suitable for use in the manufacture carbon fibre, and it will therefore be convenient to describe the invention with particular reference to this application. However, it is to be understood that the poly(acrylonitrile) homo- and co-polymers according to the invention may be used in a variety of other applications.

BACKGROUND OF THE INVENTION

Poly(acrylonitrile) (PAN) is a synthetic, semi crystalline organic polymer that typically has a linear structure of general formula $(C_3H_3N)_n$. Commercially, PAN is often produced in the form of a co-polymer with one or more other ethylenically unsaturated monomers.

Although PAN-based polymers are generally thermoplastic, they may not go through a molten transition under normal conditions, but rather degrade prior to melting.

PAN-based polymers are particularly versatile and are used to manufacture numerous products including filtration membranes, and fibres having a diverse range of applications.

PAN-based fibres have been found to be particularly suited for use in the manufacture of carbon fibre. This typically involves first thermally oxidising PAN-based fibre in air to form oxidised PAN fibre which is then carbonised at high temperature in an inert atmosphere to make the carbon fibre.

The properties of carbon fibre, such as high stiffness, high tensile strength, low weight, high chemical resistance, high temperature tolerance and low thermal expansion, make it particularly suitable for use in aerospace, civil engineering, military, automotive and sporting applications.

In use, carbon fibres are typically combined with a polymer resin to form a composite structure. The resulting composite structures are renowned for having a very high strength-to-weight ratio.

Because of its unique properties, PAN-based polymer is particularly well suited for use in the manufacture of carbon fibre. Despite being used for many years as a precursor material in the manufacture of carbon fibre, those skilled in the art will be aware that acrylonitrile presents numerous challenges in the manufacture of PAN-based polymers. In particular, due to the high reactivity of acrylonitrile and the poor solubility of PAN-based polymers, the controlled polymerisation of acrylonitrile has presented a significant challenge to polymer scientists.

PAN-based polymers have traditionally been produced by conventional free radical polymerisation, the process of which offers limited control over the molecular weight and dispersity of the resulting polymer.

Increasing the molecular weight while maintaining a low dispersity of PAN-based polymers is believed to play an important role in enhancing certain properties of products, such as carbon fibre, derived from the polymer.

Accordingly, considerable research effort has to date been directed toward improved methodology for producing PAN-based polymer.

Anionic polymerisation techniques have been applied with some success to produce relatively well-defined PAN-based polymer. However, the techniques employed require relatively harsh polymerisation conditions that would present as major limitations to adopting the technology commercially. Furthermore, the technique has only provided for a relatively modest gain in molecular weight over other known techniques.

In more recent times, considerable attention has focussed on using so called living or controlled radical polymerisation techniques to prepare PAN-based polymers. The use of such techniques has resulted in an ability to produce PAN-based polymers with an increase molecular weight and a relatively low dispersity. For example atom transfer radical polymerisation (ATRP) has been used to prepare PAN with a molecular weight ($M_n$) of about 120,000 g/mol and a dispersity ($M_w/M_n$) of about 2 (Journal of Polymer Science Part A: Polymer Chemistry Volume 51, Issue 2, pages 340-346, 2013).

Despite offering improvements in the preparation of PAN-based polymers, most of the ATRP techniques developed to date inherently introduce transition metal residues into the resulting polymer. The presence of such transition metal residues can be detrimental in certain applications for the polymer, for example in the manufacture of carbon fibre.

Other living/controlled radical polymerisation techniques have also been applied with some success. For example, Reversible Addition-Fragmentation chain Transfer (RAFT) polymerisation has been employed in the manufacture of the PAN-based polymers. For example, producing PAN with a $M_n$ of about 33,000 g/mol and a dispersity of 1.29 by RAFT polymerisation was considered to be a significant achievement (Journal of Polymer Science Part A: Polymer Chemistry Volume 45, Issue 7, pages 1272-1281, 2007). In another example, producing PAN with a Mn of 200,000 g/mol and a dispersity of 1.7-2.0 by RAFT polymerisation was also claimed as a significant progress (European Polymer Journal, Volume 44, Pages 1200-1208, 2008).

Those skilled in the art will appreciate that as the $M_n$ of a given polymer increases it becomes increasingly difficult to maintain a low dispersity. In the manufacture of PAN-based polymers it has proven difficult to not only produce polymers having a $M_n$ of greater than 100,000 g/mol but also to maintain the dispersity of the polymer below about 1.35. In such an environment an ability to produce PAN-based polymers with only a modest increase in $M_n$ while maintaining a low dispersity is considered in the art to be a significant achievement.

Accordingly, there remains an opportunity to develop PAN-based polymers that exhibit improved properties such as increased molecular weight with low dispersity.

SUMMARY OF THE INVENTION

The present invention therefore provides poly(acrylonitrile) homo- or co-polymer having a number average molecular weight ($M_n$) of at least 200,000 g/mol and a dispersity (Đ) of less than 1.3.

Considerable research to date has failed to provide for PAN-based polymers having a high $M_n$ and a low dispersity. It has now been found that PAN-based polymers can indeed be prepared having a $M_n$ of at least 200,000 g/mol and a dispersity of less than 1.3. This achievement is believed to represent a significant advance in PAN-based polymer technology.

By offering a unique molecular structure profile (i.e. high $M_n$ and low dispersity), the PAN-based polymers according to the present invention are believed to impart improved properties to polymer fibres and carbon fibres derived therefrom.

Accordingly, the invention further provides carbon fibre comprising carbonised residue of poly(acrylonitrile) homo- or co-polymer having a number average molecular weight ($M_n$) of at least 200,000 g/mol and a dispersity (Đ) of less than 1.3.

Carbon fibre in accordance with the invention is believed to advantageously exhibit improved modulus and tensile strength properties relative to equivalent PAN-based polymers having a lower $M_n$ and/or a higher dispersity.

The present invention also provides a method for producing poly(acrylonitrile) homo- or co-polymers by RAFT polymerisation, the method comprising polymerising acrylonitrile and optionally one or more ethylenically unsaturated co-monomers under the control of a RAFT agent, wherein the mole ratio of the polymerisable monomers to the RAFT agent is at least 1,000.

Conventional techniques for producing PAN-based polymers by RAFT polymerisation have typically utilised a mole ratio of monomer to RAFT agent of no more than about 800 and a mole ratio of RAFT agent to initiator in the range of about 5 to 10. Surprisingly, it has now been found that a increase in the monomer to RAFT agent ratio and/or a decrease in the RAFT agent to initiator ratio can advantageously facilitate the production of PAN-based polymers having a high $M_n$ and a low dispersity.

In one embodiment, the method according to the invention is for producing by RAFT polymerisation poly(acrylonitrile) homo- or co-polymer having a number average molecular weight ($M_n$) of at least 200,000 and a dispersity (Đ) of less than 1.3.

Dithioester (such as dithiobenzoate) and trithiocarbonate RAFT agents have been found to be particularly well suited to producing the PAN-based polymers according to the invention.

In one embodiment, dithioester and/or trithiocarbonate RAFT agents may be used in combination with a dithiocarbamate or xanthate RAFT agent.

In another embodiment, dithiobenzoate and/or trithiocarbonate RAFT agents may be used in combination with a dithiocarbamate or xanthate RAFT agent.

Using a dithioester and/or trithiocarbonate RAFT agents in combination with a dithiocarbamate or xanthate RAFT agent can assist with preparing certain PAN-based co-polymers.

In one embodiment, the poly(acrylonitrile) homo- or co-polymer according to the invention is a RAFT polymer. In a further embodiment, the poly(acrylonitrile) homo- or co-polymer is a RAFT polymer and has covalently bound thereto a dithioester (such as dithiobenzoate) or trithiocarbonate RAFT agent residue.

In a further embodiment, the poly(acrylonitrile) homo- or co-polymer is a RAFT polymer and has covalently bound thereto a dithioester (such as dithiobenzoate) or trithiocarbonate RAFT agent residue in combination with a dithiocarbamate or xanthate RAFT agent residue.

In another embodiment, the RAFT agent used in accordance with the method of the invention is a dithioester (such as dithiobenzoate) or trithiocarbonate RAFT agent, optionally in combination with a dithiocarbamate or xanthate RAFT agent.

The present invention also provides a method of producing PAN-based polymer fibre, the method comprising forming poly(acrylonitrile) homo- or co-polymer having a number average molecular weight ($M_n$) of at least 200,000 and a dispersity (Đ) of less than 1.3 into fibre.

The present invention further provides a method of producing carbon fibre, the method comprising carbonising a fibre comprising poly(acrylonitrile) homo- or co-polymer having a number average molecular weight ($M_n$) of at least 200,000 and a dispersity (Đ) of less than 1.3.

In addition to providing for PAN-based polymer having a number average molecular weight ($M_n$) of at least 200,000 and a dispersity (Đ) of less than 1.3, the present invention also advantageously provides for PAN-based polymer having even lower dispersity.

The present invention therefore also provides poly(acrylonitrile) homo- or co-polymer having a number average molecular weight ($M_n$) of at least 150,000 g/mol and a dispersity (Đ) of less than 1.25, or of at least 100,000 g/mol and a dispersity (Đ) of less than 1.2.

Further aspects and/or embodiments of the invention are discussed in more detail blow.

BRIEF DESCRIPTION OF THE DRAWINGS

The invention will herein be described with reference to the following non-limiting drawings in which.

DETAILED DESCRIPTION OF THE INVENTION

The present invention relates in general to poly(acrylonitrile) homo- or co-polymers. For convenience, these polymers may herein be referred to as "PAN-based" polymers. Those skilled in the art will appreciate that a PAN homo-polymer consists essentially of polymerised acrylonitrile monomer residues. A PAN co-polymer will comprise polymerised residues of acrylonitrile and one or more other co-monomer polymerised residues.

By being a PAN co-polymer is meant that the co-polymer will comprise greater than 50 wt. % of polymerised acrylonitrile monomer residues.

A PAN co-polymer in accordance with the invention will generally comprise 70-99 wt. % polymerised residue of acrylonitrile and 1-30 wt. % polymerised residue of one or more other ethylenically unsaturated co-monomers.

PAN-based polymers according to the invention have a number average molecular weight ($M_n$) of at least 100,000 g/mol, at least 150,000 g/mol, at least 200,000 g/mol. As used herein, the $M_n$ of the PAN-based polymers is intended to be that which is measured using Gel Permeation Chromatography (GPC), where dimethylacetamide (DMA) is used as eluent, and polymethylmethacrylate (PMMA) as standards.

In one embodiment, where the dispersity (Đ) is less than 1.3, the $M_n$ of the PAN-based polymers may be at least 225,000, or at least 250,000, or at least 275,000, or at least 300,000, or at least 325,000, or at least 350,000, or at least 375,000, or at least 400,000, or at least 425,000, or at least 450,000, or at least 550,000, or at least 650,000, or at least 750,000, or at least 850,000, or at least 950,000 g/mol, or at least 1,000,000 g/mol. In a further embodiment, the $M_n$ ranges from at least 200,000 g/mol to about 1,200,000 g/mol, or at least 200,000 g/mol to about 800,000 g/mol, or at least 200,000 g/mol to about 600,000 g/mol.

In another embodiment, where the dispersity (Đ) is less than 1.25, the $M_n$ of the PAN-based polymers may be at least 160,000, or at least 170,000, or at least 180,000, or at least 190,000, or at least 200,000, or at least 225,000, or at least 250,000, or at least 275,000, or at least 300,000, or at least 325,000, or at least 350,000, or at least 375,000, or at least 400,000, or at least 425,000, or at least 450,000, or at least 550,000, or at least 650,000, or at least 750,000, or at least 850,000, or at least 950,000 g/mol, or at least 1,000,000 g/mol. In a further embodiment, the $M_n$ ranges from at least 160,000 g/mol to about 1,200,000 g/mol, or at least 160,000 g/mol to about 800,000 g/mol, or at least 160,000 g/mol to about 600,000 g/mol.

In a further embodiment, where the dispersity (Đ) is less than 1.20, the $M_n$ of the PAN-based polymers may be at least 110,000, or at least 120,000, or at least 130,000, or at least 140,000, or at least 150,000, or at least 200,000, or at least 225,000, or at least 250,000, or at least 275,000, or at least 300,000, or at least 325,000, or at least 350,000, or at least 375,000, or at least 400,000, or at least 425,000, or at least 450,000, or at least 550,000, or at least 650,000, or at least 750,000, or at least 850,000, or at least 950,000 g/mol, or at least 1,000,000 g/mol. In a further embodiment, the $M_n$ ranges from at least 110,000 g/mol to about 1,200,000 g/mol, or at least 110,000 g/mol to about 800,000 g/mol, or at least 110,000 g/mol to about 600,000 g/mol.

In addition to having a high $M_n$, the PAN-based polymers according to the invention also have a low dispersity (Đ) of less than 1.3.

As used herein, the dispersity (Đ) of the PAN-based polymers is determined according to equation (1):

$$Đ = M_w/M_n \quad (1)$$

where $M_w$ is the mass average molecular weight, and $M_n$ is as herein defined.

$M_w$ referred to herein is intended to be that as determined by GPC in a similar manner to that outlined above in respect of determining $M_n$.

In one embodiment, the PAN-based polymers according to the invention have a dispersity (Đ) no greater than 1.28, or no greater than 1.26, or no greater than 1.25, or no greater than 1.24, or no greater than 1.22, or no greater than 1.20, or no greater than 1.18, or no greater than 1.16, or no greater than 1.14, or no greater than 1.12. In a further embodiment, the PAN-based polymers according to the invention have a dispersity ranging from about 1.05 to less than 1.3, or from about 1.1 to less than 1.3, or from about 1.12 to less than 1.3, or from about 1.05 to less than 1.25, or from about 1.05 to less than 1.2, or from about 1.05 to less than 1.15.

Where the PAN-based polymer according to the invention is a homo-polymer, it will be appreciated that the polymer will consist essentially of polymerised residues of acrylonitrile.

Where the PAN-based polymer is a co-polymer, it will generally comprise greater than 50 wt. % of polymerised acrylonitrile monomer residues, with the remaining polymerised monomers residues being derived from one or more other co-monomers.

In one embodiment, the PAN-based polymer is a PAN co-polymer comprising the polymerised residue of one or more co-monomers other than acrylonitrile in an amount of no more than about 30 wt. %, or no more than about 20 wt. %, or no more than about 15 wt. %, or no more than about 10 wt. %, or no more than about 8 wt. %, or no more than about 6 wt. %, or no more than about 4 wt. %, or no more than about 2 wt. %, or no more than about 1 wt. %, relative to the total amount of polymerised monomer residue.

In a further embodiment, a PAN co-polymer according to the invention comprises polymerised co-monomer residue other than acrylonitrile in an amount of about 1 to about 30 wt. %, or about 1 to about 20 wt. %, or about 1 to about 15 wt. %, or about 1 to about 10 wt. %, or about 1 to about 8 wt. %, or about 1 to about 6 wt. %, or about 1 to about 4 wt. %, or about 1 to about 3 wt. %, or about 1 to about 2 wt. %, relative to the total amount of polymerised monomer residue.

RAFT polymerisation has been found to be particularly well suited for producing PAN-based polymers according to the invention. Accordingly, in one embodiment the PAN-based polymer is a RAFT polymer. In that case, the invention provides a poly(acrylonitrile) RAFT homo- or co-polymer.

As used herein, the expression "RAFT polymer" or "RAFT homo- or co-polymer" is intended to mean a polymer that has been prepared by RAFT polymerisation (i.e. polymer that is formed by polymerisation of monomer under the control of a RAFT agent).

Those skilled in the art will appreciate that polymer formed by RAFT polymerisation will contain (unless it has otherwise been removed) a covalently bound residue of the RAFT agent.

It has been found that dithioester (such as dithiobenzoate) and trithiocarbonate RAFT agents are particularly well suited for producing PAN-based polymers according to the invention.

Accordingly, in one embodiment the PAN-based polymer comprises a covalently bound residue of a dithioester (such as dithiobenzoate) or trithiocarbonate RAFT agent.

In some embodiments, it has been found useful to prepare the PAN-based polymer using a dithioester (such as dithiobenzoate) and/or trithiocarbonate RAFT agent in combination with a dithiocarbamate or xanthate RAFT agent.

Accordingly, in one embodiment the PAN-based polymer comprises a covalently bound residue of a dithioester (such as dithiobenzoate) or trithiocarbonate RAFT agent in combination with a residue of a dithiocarbamate or xanthate RAFT agent.

In another embodiment, the PAN-based polymer comprises a covalently bound residue of a dithioester (such as dithiobenzoate) or trithiocarbonate RAFT agent in combination with a residue of a dithiocarbamate RAFT agent.

Dithioester (such as dithiobenzoate) and trithiocarbonate RAFT agents that contain a cyano group (—CN), a carboxylic acid group (—COOH) or both of such groups have been found to be particularly well suited for producing the PAN-based polymers according to the invention.

Where used, a dithiocarbamate or xanthate RAFT agent may also contain one or both of a cyano group (—CN) or a carboxylic acid group (—COOH).

Accordingly, in a further embodiment the PAN-based polymers comprise a cyano functionalised, carboxylic acid functionalised, or cyano and carboxylic acid functionalised RAFT agent residue covalently bound thereto.

Specific examples of RAFT agents that are well suited for producing PAN co-polymers according to the invention may be selected from 1-8:

where the or each R is independently selected from H or $CH_3$, the or each R' is independently selected from H, $CH_3$, or CN, the or each n is independently n=0-15, 4-10, or 10; and the or each m is independently m=0-10, 1-5, or 2.

Suitable RAFT agents may also be derived from the following disulphide precursor compounds:

where the or each R is independently selected from H or $CH_3$, the or each R' is independently selected from H, $CH_3$, or CN, the or each n is independently n=0-15, 4-10, or 10; and the or each m is independently m=0-10, 1-5, or 2.

Where used, a dithiocarbamate RAFT agent may be selected from 12:

where the or each R is independently selected from H or $CH_3$, and R' is independently selected from H, $CH_3$, or CN.

In one embodiment, R' in (12)=CN.

Where used, a xanthate RAFT agent may be selected from 13:

where R and R' are each independently selected from H or C1-5 alkyl, CN, C6-18 aryl, C1-5 alkyl-COOH and COOH, and R" is selected from C1-5 alkyl and C6-18 aryl.

Accordingly, in one embodiment the PAN-based polymers have covalently bound thereto a residue of a RAFT agent selected from 1-8, 12 and 13 or a precursor compound selected from 9-11. In a further embodiment, the PAN-based polymers have covalently bound thereto a residue of RAFT agent (1) or (5). In that case, in another embodiment R=H or $CH_3$, R'=CN, m=2, and n=10. In further embodiment, the PAN-based polymers have covalently bound thereto a residue of RAFT agent (1). In that case, in another embodiment R=H or $CH_3$, R'=CN, and m=2. In a further embodiment, the PAN-based polymers have covalently bound thereto a residue of RAFT agent (1), where R=H or $CH_3$, R'=CN, and m=2, and a residue of RAFT agent (12) where R=H or $CH_3$, and R'=CN.

PAN-based polymers according to the invention can be provided in a variety of physical forms. For example, the polymer may be formed into fibre. When in the form of fibre, the PAN-based polymer is well suited for use in the manufacture of carbon fibre. Such fibre can advantageously be used in a conventional carbon fibre manufacturing process. Fibre produced from PAN-based polymers according to the invention has been found to advantageously exhibit uniform diameter. Carbon fibre produced from PAN-based polymers according to the invention are expected to exhibit improved modulus and tensile properties.

The present invention is therefore also directed PAN-based polymers according to the invention in the form of fibre.

The present invention is also directed toward carbon fibre comprising carbonised residue of PAN-based polymers according to the invention.

The present invention also provides a method for producing poly(acrylonitrile) homo- or co-polymer by RAFT polymerisation. The method comprises polymerising acrylonitrile and optionally one or more ethylenically unsaturated co-monomers under the control of a RAFT agent.

Of the total amount of monomer polymerised to form the PAN-based polymers, acrylonitrile will generally be used in an amount greater than 50 wt. %.

There is no particular limitation on the type of co-monomer that may be used in accordance with the invention provided that it can be suitably polymerised with acrylonitrile. Those skilled in the art will be able to select suitable co-monomers for this task.

The co-monomer may be a monoethylenically unsaturated, multiethylenically unsaturated or comprise a mixture thereof.

Specific examples of monoethylenically unsaturated co-monomers that may be used include acid monomers such as acrylic acid, methacrylic acid, itaconic acid, allysulfonic acid, and maleic acid, crotonic acid (also including their ammonium salts, alkali metal salts and alkyl esters (such as acrylic acid methylester, methacrylic acid ethylester, ammonium itaconate), ammonia acrylate, butyl methacrylate, carboxyethyl (meth)acrylate, hydroxyethyl (meth)acrylate, propyl acrylate, stearyl acrylate, isobutyl methacrylate, methyl methacrylate, ethyl methacrylate, vinyl acetate, methyl acrylate, vinyl chloride, vinylidine chloride, styrene and its derivatives, acylamide and methacrylamide and its derivatives, 3-ammoniumcarboxylate-3-butenoic acid methyl ester, vinylsilazanes, vinylcyclic silazanes and combinations thereof.

Specific examples of multi-ethylenically unsaturated monomers that may be used include ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, oleyl maleate, glyceryl propoxy triacrylate, allyl methacrylate, methacrylic anhydride, divinylsilazanes such as 1,1,3,3-Tetramethyl-1,3-divinyldisilazane; 1,3-Divinyltetramethyldisiloxane, methylenebis (meth) acrylamide, glycerol 1,3-diglycerolate diacrylate, diurethane dimethacrylate, and combinations thereof.

In one embodiment, the method according to the invention produces a PAN co-polymer, and the amount of co-monomer used is no more than about 30 wt. %, no more than about 20 wt. %, no more than about 15 wt. %, no more than about 10 wt. %, or no more than about 8 wt. %, or no more than about 6 wt. %, or no more than about 4 wt. %, or no more than about 2 wt. %, or no more than about 1 wt. %, relative to the total amount of monomer used. In a further embodiment, the amount of corn-monomer used ranges from about 1 to about 30 wt. %, or 1 to about 20 wt. %, or 1 to about 15 wt. %, or 1 to about 10 wt. %, or about 1 to about 8 wt. %, or about 1 to about 6 wt. %, or about 1 to about 4 wt. %, or about 1 to about 3 wt. %, or about 1 to about 2 wt. %, relative to the total amount of monomer used.

The method of the invention is well suited to producing poly(acrylonitrile) homo- or co-polymer having a number average molecular weight ($M_n$) of at least 200,000 g/mol and a dispersity (Đ) of less than 1.3, or poly(acrylonitrile) homo- or co-polymer having a number average molecular weight ($M_n$) of at least 150,000 g/mol and a dispersity (Đ) of less than 1.25, or of at least 100,000 g/mol and a dispersity (Đ) of less than 1.2, as described herein.

The monomers used in accordance with the method of the invention are polymerised under the control of a RAFT agent. By being polymerised "under the control" of the RAFT agent is meant that the monomers are polymerised via a Reversible Addition-Fragmentation chain Transfer (RAFT) mechanism to form polymer.

RAFT polymerisation of ethylenically unsaturated monomers is described in WO 98/01478, and in effect is a radical polymerisation technique that enables polymers to be prepared having a well defined molecular architecture and low dispersity.

As previously mentioned, despite RAFT polymerisation being renowned for providing polymers having a well defined molecular architecture and low dispersity, imparting such properties to the polymerisation of acrylonitrile has remained a significant challenge to polymer scientists. Most notably, until recently it has not been possible to prepare PAN-based polymers having a $M_n$ greater than about 33,000 g/mol and a dispersity of less than 1.29, even by RAFT polymerisation. The present invention surprisingly and advantageously has met this challenge.

Without wishing to be limited by theory, it is believed that the selection of a particular RAFT agent or precursor thereto may also facilitate in providing for PAN-based polymers having a high $M_n$ and a low dispersity.

In one embodiment, the RAFT agent or precursor thereto used in the method of the invention is selected from a dithiobenzoate and trithiocarbonate RAFT agent.

In some embodiments, it has been found useful to prepare the PAN-based polymer using a dithioester (such as dithiobenzoate) and/or trithiocarbonate RAFT agent in combination with a dithiocarbamate or xanthate RAFT agent. Without wishing to be limited by theory, it is believed that using a dithioester (such as dithiobenzoate) and/or trithiocarbonate RAFT agent in combination with a dithiocarbamate or xanthate RAFT agent may also facilitate in providing for PAN-based polymers having a high $M_n$ and a low dispersity.

Accordingly, in one embodiment the RAFT agent or precursor thereto used in the method of the invention is selected from a dithioester (such as dithiobenzoate) and/or trithiocarbonate RAFT agent in combination with a dithiocarbamate or xanthate RAFT agent.

Dithioester (such as dithiobenzoate) and trithiocarbonate RAFT agents or precursors thereto that contain a cyano group (—CN), a carboxylic acid group (—COOH) or both of such groups have been found to be particularly well suited for producing the PAN-based polymers according to the invention.

Accordingly, in a further embodiment the RAFT agent or precursor thereto used in the method of the invention is selected from a cyano functionalised, carboxylic acid functionalised, or cyano and carboxylic acid functionalised dithioester (such as dithiobenzoate) or trithiocarbonate RAFT agent or RAFT agent precursor compound.

Where used, a dithiocarbamate or xanthate RAFT agent may also contain one or both of a cyano group (—CN) or a carboxylic acid group (—COOH).

Specific examples of RAFT agents or RAFT agent precursor compounds that are well suited for use in the method of the invention include those herein defined.

In one embodiment the RAFT agent used in the method of the invention is selected compounds 1-8. In another embodiment, the RAFT agent used in the method of the invention is derived from a precursor compound selected from compounds 9-11. In a further embodiment, the RAFT agent used in the method of the invention is selected from compounds (1) or (5), where R=H or $CH_3$, R'=CN, m=2, and n=10. In a further embodiment, RAFT agent used in the method of the invention is selected from RAFT agent (1), where R=H or $CH_3$, R'=CN, and m=2, and RAFT agent (12) where R=H or $CH_3$, and R'=CN.

In some embodiments, it has been found useful to prepare the PAN-based polymer using (1) a dithioester (such as dithiobenzoate) and/or trithiocarbonate RAFT agent in combination with a dithiocarbamate or xanthate RAFT agent, and (2) acrylonitrile monomer in combination with a multiethylenically unsaturated co-monomer. Without wishing to be limited by theory, it is believed that using this combination of reagents may also facilitate in providing for PAN-based polymers having a high $M_n$ and a low dispersity.

Accordingly, in one embodiment the RAFT agent or precursor thereto used in the method of the invention is selected from a dithioester (such as dithiobenzoate) or trithiocarbonate RAFT agent in combination with a dithiocarbamate or xanthate RAFT agent, and the acrylonitrile monomer is polymerised in combination with multiethylenically unsaturated co-monomer.

In a further embodiment, the multiethylenically unsaturated co-monomer is a divinyldisilazane compound.

According to the method of the invention, the mole ratio of the polymerisable monomer used to the RAFT agent used is at least 1,000. Where a RAFT agent precursor compound is used in the method, this ratio relates to the RAFT agent derived from the precursor compound. Where a combination of RAFT agents is used, the ratio relates to combined total of the RAFT agents used. Without wishing to be limited by theory, it is believed that providing monomer in a significant excess to what would conventionally be employed facilitates formation of polymer having a high $M_n$ and a low dispersity.

In one embodiment, the mole ratio of the polymerisable monomer to the RAFT agent is at least about 1,500, or at least about 2,000, or at least about 2,500, or at least about 3,000, or at least about 3,500, or at least about 4,000, or at least about 5,000, or at least about 6,000, or at least about 7,000, or at least about 8,000, or at least about 10,000, or at least about 12,000. In a further embodiment the mole ratio of polymerisable monomer to the mole ratio of RAFT agents ranges from about 1,000 to about 20,000, or about 1,000 to about 15,000, or about 2,000 to about 10,000, or about 4,000 to about 10,000. In one embodiment, the mole ratio of polymerisable monomer to the mole ratio of RAFT agents ranges from about 5,000 to about 15,000.

The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction of the initiator or the initiating radicals with the monomers being polymerised.

Thermal initiators are chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis-{2-methyl-N-[1,1-bis(hydroxymethyl)-2-hydroxyethyl] propionamide}, 2,2'-azobis{2-methyl-N-[1,1-bis (hydroxymethyl)-2-ethyl]propionamide}-, 2,2'-azobis [2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Initiators which have an appreciable solubility in a more hydrophilic reaction medium typically include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine) dihydrochloride, 2,2'-azobis(2-amidinopropane) di hydrochloride, 2,2'- azobis{2-methyl-N-[1,1-bis(hydroxymethyl)-2-ethyl]propionamide}, 2,2'-azobis[2-methyl-N-(2-hydroxyethyl) propionamide], 2,2'-azobis(isobutyramide) dihydrate, and derivatives thereof.

Initiators which have an appreciable solubility in a more hydrophobic reaction medium typically include oil soluble initiators such as azo compounds exemplified by the well known material 2,2'-azobisisobutyronitrile. Other readily available initiators are acyl peroxides such as acetyl and benzoyl peroxide as well as alkyl peroxides such as cumyl and t-butyl peroxides. Hydroperoxides such as t-butyl and cumyl hydroperoxides may also be used.

The source of initiating radicals will generally be provided by an initiator compound per se rather than from the spontaneous generation of radicals from monomers.

Without wishing to be limited by theory, it is believed that selecting a particular mole ratio of RAFT agent to initiator may also facilitate in providing for PAN-based polymers having a high $M_n$ and a low dispersity.

In a further embodiment, the method of the invention further comprises initiating the polymerisation using an initiator compound, wherein the mole ratio of the RAFT agent to initiator compound is no more than about 3, or no more than 2.8, or no more than about 2.5, or no more than about 2.2, or no more than about 2, or no more than about 1.5, or no more than about 1, or no more than about 0.8, or no more than about 0.5. In a further embodiment, the mole ratio of RAFT agent to initiator compound ranges from about 0.1 to about 3, or from about 0.3 to about 3, or from about 0.3 to about 2.

In another embodiment the initiator compound is an azo compound such as 2,2'-azobis(isobutyronitrile) (AIBN).

The method according to the invention can advantageously be performed using conventional RAFT polymerisation techniques and equipment. The polymerisation may be performed in solution (e.g. using a suitable solvent), or as a suspension or emulsion polymerisation.

In one embodiment, the polymerisation is a solution polymerisation conducted in a suitable reaction medium or solvent. Without wishing to be limited by theory, it is believed that the selection of a suitable reaction medium or solvent may also facilitate providing for PAN-based polymers having a high $M_n$ and a low dispersity.

In one embodiment, the polymerisation is performed in a reaction medium selected from dimethylsulfoxide (DMSO), dimethylformamide (DMF), dimethylactetamide (DMA), ethylene carbonate (EC), propylene carbonate (PC) and combinations thereof.

In another embodiment, the polymerisation is performed in a reaction medium selected from dimethylsulfoxide (DMSO), ethylene carbonate (EC), and combinations thereof.

In addition to factors such as the polymerisable monomer to RAFT agent mole ratio, the selection of the RAFT agent, the RAFT agent to initiator compound mole ratio and the selection of reaction medium or solvent, without wishing to be limited by theory it is believed that the selection of polymerisation temperature may also facilitate providing for PAN-based polymers having a high $M_n$, and a low dispersity.

Accordingly, in a further embodiment, the polymerisation is conducted at a temperature of no more than 80° C., or no more than 70° C., or no more than 65° C., or no more than 60° C., or no more than 55° C., or no more than about 50° C., or no less than about 40° C. In a further embodiment, the polymerisation is conducted at a temperature within the range of 50° C. to 70° C., or 50° C. to 65° C.

The method according to the invention may further comprise forming the resulting PAN-based polymer into fibre. Formation of such fibre can be achieved using techniques known in the art such as solution spinning (e.g. wet spinning, dry-wet spinning or so-called air-gap spinning), melt spinning and electrospinning. The typical solvents that can be used for these techniques include DMSO, DMF and DMA.

In a further aspect, the present invention provides a method of forming poly(acrylonitrile) homo- or co-polymer fibre, said method comprising solution spinning (including wet spinning, dry-wet spinning), electrospinning or melt spinning poly(acrylonitrile) homo- or co-polymer according to the invention.

In a further aspect, the present invention provides a method of forming poly(acrylonitrile) homo- or co-polymer fibre, said method comprising wet spinning, electrospinning or melt spinning poly(acrylonitrile) homo- or co-polymer according to the invention.

In one embodiment, the PAN-based polymer according to the invention is provided in the form of fibre.

Fibre comprising PAN-based polymers according to the invention can advantageously be used as a precursor in the manufacture of carbon fibre.

The present invention therefore also provides a method of producing carbon fibre, the method comprising carbonising a fibre comprising PAN-based polymer according to the invention.

PAN-based polymer according to the invention in the form of fibre can conveniently be converted into carbon fibre using techniques known in the art.

The conversion of the precursor PAN-based fibre to carbon fibre may also first involve stabilisation of the fibre in air by heating at a temperature of 200-400° C. under an oxidizing atmosphere. Carbonisation of the so-formed stabilized fibre may then be performed by heating it at a temperature of at least 1000° C. under an inert atmosphere.

The invention will now be described with reference to the following examples which illustrates some preferred embodiments of the invention. However, it is to be understood that the particularity of the following description is not to supersede the generality of the preceding description of the invention.

EXAMPLES

General RAFT Polymerisation Procedures Used in the Examples (Unless Indicated Otherwise)

Required amount of acrylonitrile (AN), a RAFT agent, an initiator 2,2'-azobisiosbutylonitrile (AIBN), and a specified solvent (e.g. DMSO) were added to a reactor, which was then degassed by purging with nitrogen, followed by vacuum application. The reactor was finally charged with nitrogen and sealed. Then, the reactor was gradually heated to a set temperature (e.g. 60° C.) and held for a required period of time. After the polymerisation was completed, the resultant mixture was diluted with the solvent first, if necessary, and the polymer was precipitated in methanol, and dried in a vacuum oven at 40° C.

The polymer prepared was analysed by gel permeation chromatography (GPC), using a Shimadzu GPC System with Styragel HT 3, HT 4, HT 5 and HT 6 columns (7.8 mm×300 mm, 10 µm particle size). Dimethylacetamide (DMA) containing 0.05 M LiCl was used as eluent with a flow rate of 1.0 ml/min at 80° C. The GPC was calibrated

Reference Example 1

Figure 1:
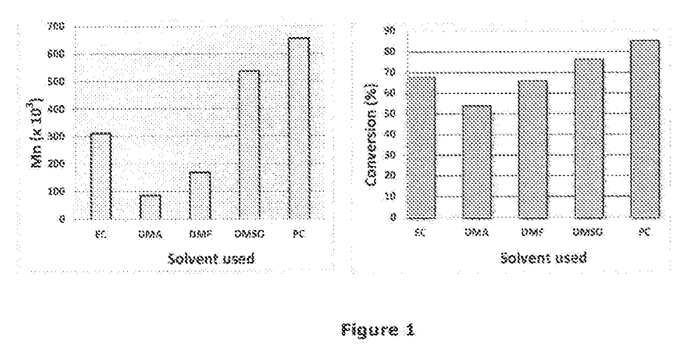
FIG. 1 illustrates the effect of the solvent used on the molecular weight and yield of the PAN obtained under the same polymerisation conditions (AN=5 mol/L, AIBN=$1.60 \times 10^{-3}$ mol/L)

Add 5 mol/L AN and 1.60×10$^{-3}$ mol/L AIBN, together with the specified solvent to a Shlenk flask. The solution was degassed and the flask was placed in an oil bath held at a temperature of 60° C. for 12 hours. The reaction mixture was diluted with a specified solvent, if necessary and the polymer precipitated in methanol and dried in a vacuum oven at 30-40° C. until constant weight. The results in FIG. 1 show how the solvent selection in acrylonitrile polymerisation can alter the results. It is evident that the solvent used has an effect on the monomer conversion rate and molecular weight of the PAN polymers obtained. EC, DMSO and PC are useful solvents for PAN preparation, resulting in a higher molecular weight and polymer yield than DMF (Dimethylformamide) and DMA (Dimethylacetamide).

Example 2

Add 6 mol/L acrylonitrile (AN) and 2% methyl methacrylates (MMA), and DMSO were added to a Shlenk flask. An initiator AIBN and a RAFT agent 4-Cyano-4-(phenylcarbonothioylthio)pentanoic acid were added into the reaction mixture at a molar ratio of 1:2, and AN to the RAFT agent ratio was 8500:1. The solution was degassed. Then the flask was placed in an oil bath held at a temperature of 61° C. for 15 hours. The reaction mixtures were diluted with DMSO, and the polymers precipitated in methanol and dried in a vacuum oven at 30-40° C. until constant weight.

The reaction product was analysed by GPC, and the results are:

$M_n$=240072, and PDI=1.13

Similar results were obtained with methyl acrylate as the comonomer.

Example 3

Same procedure as in Example 2 was used in Example 3 except the AN to the RAFT agent ratio was 10000:1, with 2% MMA+Itaconic acid as comonomers, and the polymerisation temperature was 65° C.

The GPC results are: $M_n$=200610, and PDI=1.11

Example 4

Similar procedure as in Example 2 was used in Example 4, but the solvent used was PC, and AN to RAFT ratio was 9000:1, without a comonomer used.

The GPC results are: $M_n$=465015, PDI=1.15

Example 5

RAFT polymerisation of AN was carried out with DMSO as the solvent medium. AN (6.1 mol/L), DMSO, a RAFT agent 4-Cyano-4-(phenylcarbonothioylthio)pentanoic acid and an initiator AIBN were added into a reactor. The mole ratio of AN to the RAFT agent was 17,000, and the mole ratio of the RAFT agent to AIBN was 1.4. The reactor was degassed by purging with nitrogen followed by vacuum application. The reactor was finally charged with nitrogen and sealed. The reaction was performed at 60° C. for 18 hours. The polymer was precipitated in methanol and dried in a vacuum oven at 40° C. until constant weight.

The reaction product was analysed by GPC, and the results are:

$M_n$=365,930; and PDI=1.14

Figure 2:
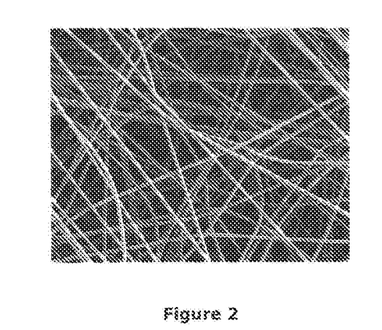
FIG. 2 illustrates an SEM image of electrospun PAN fibres produced from PAN-based polymer according to the invention.

The PAN polymer obtained from Example 5 was dissolved in DMF to form a 15% polymer solution. This solution was then used to produce PAN fibres by electrospinning at applied voltage of 14.6 kv, injection speed (flow rate) of 0.4 mL/h and constant tip-to-collector distance of 20 cm.

The SEM image of the electrospun PAN fibres produced from this polymer is shown in FIG. 2.

Example 6

RAFT copolymerisation of AN with methyl methacrylate (2 wt %) as a comonomer, was performed in the presence of 4-Cyano-4-(phenylcarbonothioylthio)pentanoic acid as a RAFT agent, and using the procedure similar to Example 5, except that the mole ratio of the monomers to the RAFT agent was 7,828, and the RAFT agent to AIBN=2.0. The polymerisation reaction was carried out at 60° C. for 16 hours. The resultant polymer was analysed by GPC, and the results are:

$M_n$=200,108; and PDI=1.21

Example 7

RAFT copolymerisation of AN with methyl methacrylate (2.3 wt %) and itaconic acid (2.3 wt %) as comonomers, was performed in the presence of 4-Cyano-4-(phenylcarbonothioylthio)pentanoic acid as a RAFT agent, using the procedure similar Example 5, except that the mole ratio of the monomers to the RAFT agent was 11,630, and the RAFT agent to AIBN=1.5. The polymerisation reaction was carried out at 61° C. for 18 hours. The resultant polymer was analysed by GPC, and the results are:

$M_n$=251,121; and PDI=1.15

Example 8

RAFT copolymerisation of AN with 0.88 mol % 1,1,3,3-tetramethyl-1,3-divinyldisilazane as a comonomer was performed in the presence of two RAFT agents: 4-Cyano-4-(phenylcarbonothioylthio)pentanoic acid (abbreviated at RAFT A) and Cyanomethyl N-methyl-N-phenyl dithiocarbamate (abbreviated as RAFT B), under the similar operational conditions as used in Example 5. However, the mole ratio of the monomers: RAFT agents=5138 (where AN to RAFT A=9740), and the mole ratio of RAFT A to AIBN=2.6, RAFT B to AIBN=2.3. The polymerisation was conducted at 60° C. for 18 h.

The resultant polymer was analysed by GPC, and the results are:

$M_n$=1,298,331; and PDI=1.12

For comparison, the reaction was carried out under the same conditions again as used in Example 8, except that only RAFT A was used without addition of RAFT B.

The GPC results of the resultant polymer: Mn=1,161,265; and PDI=1.60.

Example 9

RAFT copolymerisation of AN with methyl methacrylate (1.3 wt %) and itaconic acid (1.3 wt %) as comonomers, was performed in the presence of 4-Cyano-4-[(dodecylsulfanylthiocarbonyl)sulfanyl]pentanoic acid as a RAFT agent. The polymerisation procedures and conditions used were similar to Example 5, except that the mol ratio of the monomers to the RAFT agent was 11,486, and the RAFT agent to AIBN=1.47. The polymerisation reaction was carried out at 60° C. for 24 hours.

The resultant polymer was analysed by GPC, and the results are: Mn=433841; and PDI=1.21.

Example 10

Precursor PAN-based polymers produced by any of the preceding examples can be made into carbon fibres using typical methods in the literature (US2010003515 or Sporl et al, J. Polym. Sci. A Polym. Chem. doi: 10.1002/pola.27121)

The PAN-based polymers can be dissolved in a solvent, such as DMF and filtered. The polymer can then be wet spun on a spinning device (such as Fourne Laboratory scale wet spinning device). The thus formed precursor fibres are then coagulated in a mixture of water and solvent. The thus obtained coagulated yarn can then be washed with water, hot stretched and then dried. Oxidation is then carried out in a furnace, using temperatures of the order of 160-250 deg. C. to stabilise the precursor fibre. The obtained stabilized fibres can then undergo a pre-carbonization treatment in nitrogen atmosphere at a temperature between 300 to 700 deg. C. Finally the fibres are subjected to a carbonization treatment in nitrogen atmosphere at 1500 deg. C.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Many modifications will be apparent to those skilled in the art without departing from the scope of the present invention.

The invention claimed is:

1. A method for producing poly(acrylonitrile) homo- or co-polymers by RAFT polymerisation, the method comprising polymerising acrylonitrile and optionally one or more ethylenically unsaturated co-monomers under the control of a RAFT agent, wherein (i) the mole ratio of the polymerisable monomers to the RAFT agent is at least 4,000, and (ii) the mole ratio of the RAFT agent to initiator compound is no more than 3.

2. The method according to claim 1, wherein the polymerisation is conducted at a temperature of no more than 70° C.

3. The method according to claim 1, wherein the acrylonitrile is copolymerised with one or more ethylenically unsaturated co-monomers selected from acrylic acid, methacrylic acid, itaconic acid, allylsulfonic acid, maleic acid, crotonic acid, ammonia acrylate, butyl methacrylate, carboxyethyl (meth)acrylate, hydroxyethyl (meth)acrylate, propyl acrylate, stearyl acrylate, isobutyl methacrylate, methyl methacrylate, ethyl methacrylate, vinyl acetate, methyl acrylate, vinyl chloride, vinylidine chloride, styrene and its derivatives, acylamide and methacrylamide and its derivatives, 3-ammoniumcarboxylate-3-butenoic acid methyl ester, vinylsilazanes, vinylcyclic silazanes, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth) acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl) ethane tri(meth)acrylate, 1,1,1-tris(hydroxymethyl)propane di(meth)acrylate, 1,1,1-tris(hydroxymethyl)propane tri (meth)acrylate, triallyl cyanurate, triallyl isocyanurate, triallyl trimellitate, diallyl phthalate, diallyl terephthalte, divinyl benzene, methylol (meth)acrylamide, triallylamine, oleyl maleate, glyceryl propoxy triacrylate, allyl methacrylate, methacrylic anhydride, 1,1,3,3-Tetramethyl-1,3-divinyldisilazane; 1,3-divinyltetramethyldisiloxane, methylenebis (meth) acrylamide, glycerol 1,3-diglycerolate diacrylate, diurethane dimethacrylate, ammonium and alkali metal salts and alkyl esters of the acid containing monomers, and combinations thereof.

4. The method according to claim 1, wherein the RAFT agent used is a dithioester or trithiocarbonate RAFT agent.

5. The method according to claim 4, wherein the dithioester RAFT agent is a dithiobenzoate RAFT agent.

6. The method according to claim 1, wherein the RAFT agent used is a dithioester or trithiocarbonate RAFT agent in combination with a dithiocarbamate or xanthate RAFT agent.

7. The method according to claim 4, wherein the dithioester or trithiocarbonate RAFT agent is cyano functionalised, carboxylic acid functionalised, or cyano and carboxylic acid functionalised.

8. The method according to claim 1, wherein the RAFT agent used is selected from one or more of 1-8, or is provided by a RAFT agent precursor compound selected from 9-11:

(1)

(2)

(3)

(4)

(5)

where the or each R is independently selected from H or CH$_3$, the or each R' is independently selected from H, CH$_3$, or CN, the or each n is independently n=0-15, and the or each m is independently m=0-10.

9. The method according to claim 8, wherein the RAFT agent is selected from 1 or 5.

10. The method according to claim 1, wherein the polymerisation is performed in a reaction medium and the reaction medium is selected from dimethylsulfoxide, ethylene carbonate, propylene carbonate, and combinations thereof.

11. The method according to claim 1, wherein the resulting poly(acrylonitrile) homo- or co-polymers have a number average molecular weight (M$_n$) of at least 400,000 g/mol and a dispersity (Đ) of less than 1.25.

12. A method of producing carbon fibre, the method comprising carbonising a fibre comprising poly(acrylonitrile) homo- or co-polymers produced according to claim 1.

13. Carbon fibre comprising carbonised residue of poly(acrylonitrile) homo- or co-polymer produced according to claim 1.

14. The method according to claim 1 wherein the resulting poly(acrylonitrile) homo- or co-polymers are formed into fibre.

* * * * *